United States Patent
Melton et al.

(10) Patent No.: US 8,745,986 B2
(45) Date of Patent: Jun. 10, 2014

(54) SYSTEM AND METHOD OF SUPPLYING FUEL TO A GAS TURBINE

(75) Inventors: Patrick Benedict Melton, Horse Shoe, NC (US); Bryan Wesley Romig, Simpsonville, SC (US); Lucas John Stoia, Taylors, SC (US); Thomas Edward Johnson, Greer, SC (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 13/545,296

(22) Filed: Jul. 10, 2012

(65) Prior Publication Data

US 2014/0013723 A1    Jan. 16, 2014

(51) Int. Cl.
*F02C 3/16* (2006.01)

(52) U.S. Cl.
USPC .............................................. 60/735; 60/39.37

(58) Field of Classification Search
CPC ............. F23R 3/34; F23R 3/224; F23R 3/286
USPC ......... 60/733, 735–737, 739, 740, 746, 39.37
See application file for complete search history.

(56) References Cited

U.S. PATENT DOCUMENTS

| | | | |
|---|---|---|---|
| 2,479,777 A | 8/1949 | Price | |
| 4,928,481 A * | 5/1990 | Joshi et al. | 60/737 |
| 7,603,863 B2 | 10/2009 | Widener et al. | |
| 8,407,892 B2 * | 4/2013 | DiCintio et al. | 29/889.22 |
| 8,596,069 B2 * | 12/2013 | Shershnyov et al. | 60/733 |
| 2001/0049932 A1 * | 12/2001 | Beebe | 60/39.06 |
| 2003/0024234 A1 | 2/2003 | Holm et al. | |
| 2009/0084082 A1 * | 4/2009 | Martin et al. | 60/39.281 |
| 2010/0229557 A1 * | 9/2010 | Matsumoto et al. | 60/737 |
| 2011/0067402 A1 * | 3/2011 | Wiebe et al. | 60/740 |
| 2011/0296839 A1 * | 12/2011 | Van Nieuwenhuizen et al. | 60/737 |
| 2013/0174560 A1 * | 7/2013 | Wiebe et al. | 60/737 |
| 2013/0239575 A1 * | 9/2013 | Chen et al. | 60/747 |
| 2013/0283801 A1 * | 10/2013 | Romig et al. | 60/733 |
| 2013/0283807 A1 * | 10/2013 | Stoia et al. | 60/772 |
| 2013/0298560 A1 * | 11/2013 | Melton et al. | 60/733 |

\* cited by examiner

*Primary Examiner* — Phutthiwat Wongwian
(74) *Attorney, Agent, or Firm* — Dority & Manning, PA

(57) ABSTRACT

A fuel supply system for a gas turbine includes a combustion section, a transition duct downstream from the combustion section, a turbine section downstream from the transition duct, and a first stage of stationary vanes circumferentially arranged inside the turbine section. A hot gas path is between the transition duct and the stationary vanes, and a fuel injector provides fluid communication into the hot gas path. A method of supplying fuel to a gas turbine includes combusting a first fuel in a combustion chamber to produce combustion gases, flowing the combustion gases through a transition duct to a hot gas path, and flowing the combustion gases through the hot gas path to a first stage of stationary vanes in a turbine section. The method further includes injecting a second fuel into the hot gas path downstream from the transition duct and upstream from the first stage of stationary vanes.

20 Claims, 5 Drawing Sheets

SYSTEM AND METHOD OF SUPPLYING FUEL TO A GAS TURBINE

FIELD OF THE INVENTION

The present invention generally involves a system and method of supplying fuel to a gas turbine. In particular embodiments, one or more fuel injectors may be circumferentially arranged between a combustor and a turbine to supply fuel to a hot gas path.

BACKGROUND OF THE INVENTION

Gas turbines are widely used in industrial and commercial operations. For example, industrial gas turbines typically include one or more combustors to generate power or thrust. A typical commercial gas turbine used to generate electrical power includes a compressor section at the front, a combustor section around the middle, and a turbine section at the rear. Ambient air enters a compressor as a working fluid, and the compressor progressively imparts kinetic energy to the working fluid to produce a compressed working fluid at a highly energized state. The compressed working fluid exits the compressor and flows to one or more combustors where it mixes with fuel and ignites in a combustion chamber to generate combustion gases having a high temperature and pressure. The combustion gases flow to a turbine where they expand to produce work. For example, expansion of the combustion gases in the turbine may rotate a shaft connected to a generator to produce electricity.

The combustion gases exiting the turbine include varying amounts of nitrogen oxides, carbon monoxide, unburned hydrocarbons, and other undesirable emissions, with the actual amount of each emission dependent on the combustor design and operating parameters. For example, a longer residence time of the fuel-air mixture in the combustors generally increases the nitrogen oxide levels, while a shorter residence time of the fuel-air mixture in the combustors generally increases the carbon monoxide and unburned hydrocarbon levels. Similarly, higher combustion gas temperatures associated with higher power operations generally increase the nitrogen oxide levels, while lower combustion gas temperatures associated with lower fuel-air mixtures and/or turndown operations generally increase the carbon monoxide and unburned hydrocarbon levels.

In a particular combustor design, one or more late lean injectors, passages, or tubes may be circumferentially arranged around the combustion chamber downstream from the fuel nozzles. A portion of the compressed working fluid exiting the compressor may be diverted to flow through the injectors to mix with fuel to produce a lean fuel-air mixture. The lean fuel-air mixture may then flow into the combustion chamber where it ignites to raise the combustion gas temperature and increase the thermodynamic efficiency of the combustor. In another approach to increasing efficiency, fuel may be injected through a first stage of stationary vanes or nozzles located in the turbine section, as described in U.S. Pat. No. 7,603,863, assigned to the same assignee as the present invention. The injected fuel may cool the surface of the stationary nozzles before igniting to raise the combustion gas temperature flowing through the turbine section.

Although injecting fuel through late lean injectors in the combustor section and/or stationary nozzles in the turbine section effectively increases efficiency without producing a corresponding increase in undesirable emissions, continued improvements in systems and methods of supplying fuel in a gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a fuel supply system for a gas turbine that includes a combustion section, a transition duct downstream from the combustion section, a turbine section downstream from the transition duct, and a first stage of stationary vanes circumferentially arranged inside the turbine section. A hot gas path is between the transition duct and the first stage of stationary vanes, and a fuel injector provides fluid communication into the hot gas path downstream from the transition duct and upstream from the first stage of stationary vanes.

Another embodiment of the present invention is a fuel supply system for a gas turbine that includes a compressor section, a combustion chamber downstream from the compressor section, a transition duct downstream from the combustion chamber, a turbine section downstream from the transition duct, and a first stage of stationary vanes circumferentially arranged inside the turbine section. A sleeve downstream from the transition duct provides fluid communication between the transition duct and the first stage of stationary vanes, and a fuel injector provides fluid communication into the sleeve between the transition duct and the first stage of stationary vanes.

Embodiments of the present invention may also include a method of supplying fuel to a gas turbine that includes combusting a first fuel in a combustion chamber to produce combustion gases, flowing the combustion gases through a transition duct to a hot gas path, and flowing the combustion gases through the hot gas path to a first stage of stationary vanes in a turbine section. The method further includes injecting a second fuel into the hot gas path downstream from the transition duct and upstream from the first stage of stationary vanes.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
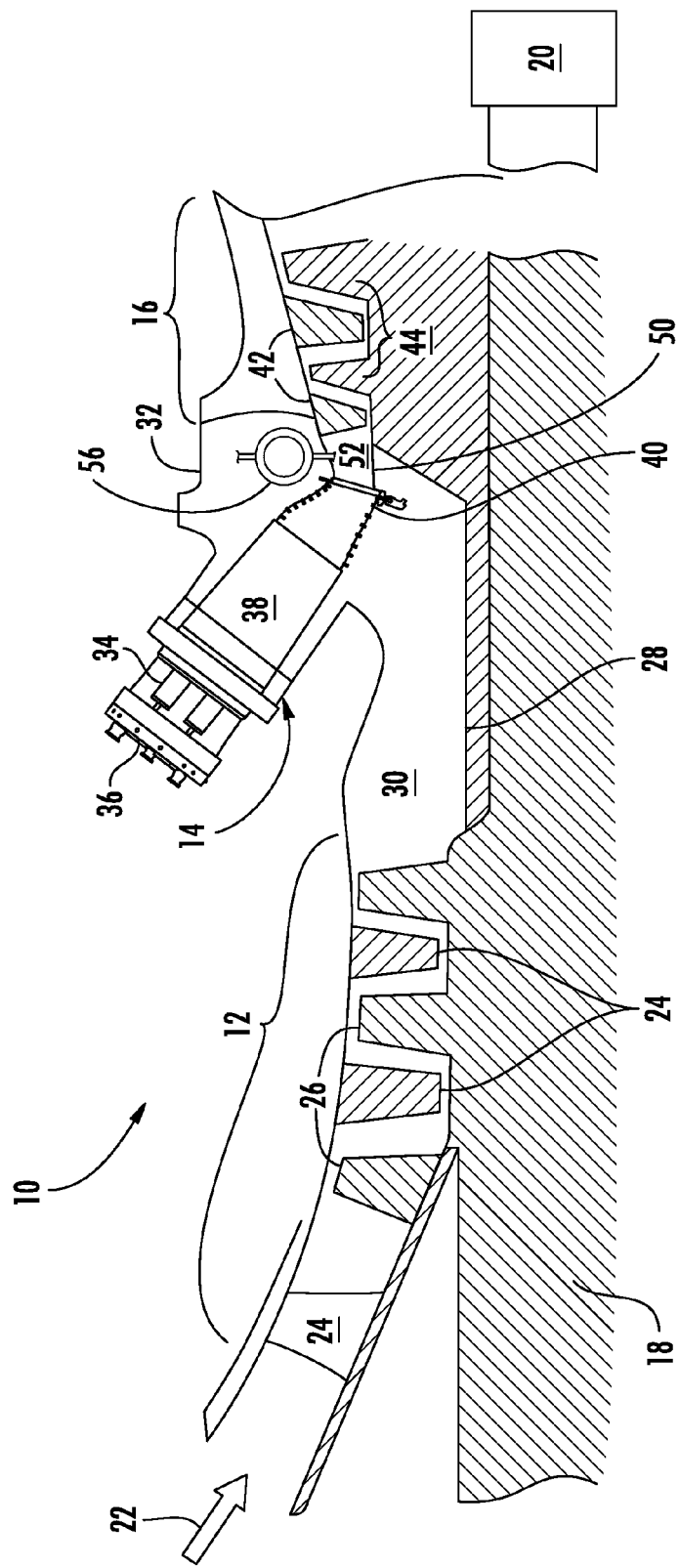
FIG. 1 is a simplified side cross-section view of a gas turbine according to a first embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method of supplying fuel to a gas turbine. The system generally includes a combustion section and a turbine section as is known in the art. A sleeve defines a hot gas path between the combustion section and the turbine section, and one or more fuel injectors provide fluid communication through the sleeve and into the hot gas path. In this manner, fuel may be injected through the sleeve and into the hot gas path downstream from the combustion section.

FIG. 1 provides a simplified cross-section view of a gas turbine 10 according to one embodiment of the present invention. As shown, the gas turbine 10 generally includes a compressor section 12 at the front, a combustion section 14 radially disposed around the middle, and a turbine section 16 at the rear. The compressor section 12 and the turbine section 16 typically share a common rotor 18 connected to a generator 20 to produce electricity.

The compressor section 12 may include an axial flow compressor in which a working fluid 22, such as ambient air, enters the compressor section 12 and passes through alternating stages of stationary vanes 24 and rotating blades 26. A compressor casing 28 contains the working fluid 22 as the stationary vanes 24 and rotating blades 26 accelerate and redirect the working fluid 22 to produce a continuous flow of compressed working fluid 22. The majority of the compressed working fluid 22 flows through a compressor discharge plenum 30 to the combustion section 14.

The combustion section 14 may include one or more combustors known in the art. For example, as shown in FIG. 1, a combustor casing 32 may circumferentially surround some or all of the combustion section 14 to contain the compressed working fluid 22 flowing to the combustion section 14. One or more fuel nozzles 34 may be radially arranged in an end cover 36 to supply fuel to a combustion chamber 38 downstream from the fuel nozzles 34. Possible fuels include, for example, one or more of blast furnace gas, coke oven gas, natural gas, vaporized liquefied natural gas (LNG), hydrogen, and propane. The compressed working fluid 22 may flow from the compressor discharge plenum 30 along the outside of the combustion chamber 38 before reaching the end cover 36 and reversing direction to flow through the fuel nozzles 34 to mix with the fuel. The mixture of fuel and compressed working fluid 22 flows into the combustion chamber 38 where it ignites to generate combustion gases having a high temperature and pressure. The combustion gases generally flow out of the combustion chamber 38 through a transition duct 40 to the turbine section 16.

The turbine section 16 may include alternating stages of stationary vanes 42 and rotating blades 44. The first stage of vanes 42 redirects and focuses the combustion gases onto the first stage of blades 44. As the combustion gases pass over the first stage of blades 44, the combustion gases expand, causing the blades 44 and rotor 18 to rotate. The combustion gases then flow to the next stage of vanes 42 which redirect the combustion gases to the next stage of blades 44, and the process repeats for the following stages.

Figure 2:
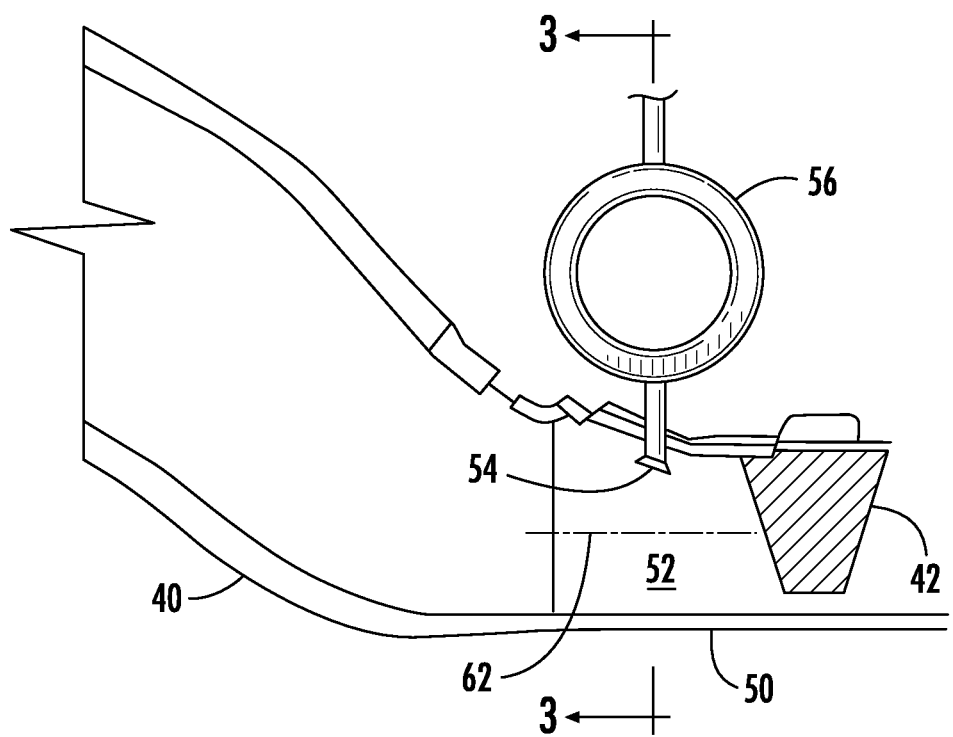
FIG. 2 is an enlarged side cross-section view of a portion of the gas turbine shown in FIG. 1.

FIG. 2 provides an enlarged side cross-section view of a portion of the gas turbine 10 shown in FIG. 1. As shown in FIGS. 1 and 2, the gas turbine 10 further includes a sleeve 50 downstream from the transition duct 40 and upstream from the first stage of vanes 42. The sleeve 50 defines a hot gas path 52 between the transition duct 40 and the first stage of stationary vanes 42 to provide fluid communication for the combustion gases to flow between the transition duct 40 and the first stage of stationary vanes 42. In addition, one or more fuel injectors 54, passages, or tubes may be circumferentially arranged around the sleeve 50 to provide fluid communication through the sleeve 50 and into the hot gas path 52 between the transition duct 40 and the first stage of stationary vanes 42.

As shown in FIGS. 1 and 2, a fuel plenum 56 may be located outside of the sleeve 50 and gas path 52 in the compressor discharge plenum 30 to supply fuel to the fuel injectors 54. The fuel plenum 56 may in turn receive fuel from a common manifold (not shown) that may be located inside or outside of the gas turbine 10. The fuel supplied by the fuel plenum 56 may be the same or a different fuel than is supplied to the fuel nozzles 34. In particular embodiments, the fuel plenum 56 may have a toroidal shape that increases the outer surface area of the fuel plenum 56 to enhance heat transfer from the compressed working fluid 22 flowing around the fuel plenum 56 inside the compressor discharge plenum 30. In this manner, the compressed working fluid 22 may pre-heat the fuel flowing through the fuel plenum 56 before the fuel reaches the fuel injectors 54 and is injected into the hot gas path 52.

Figure 3:
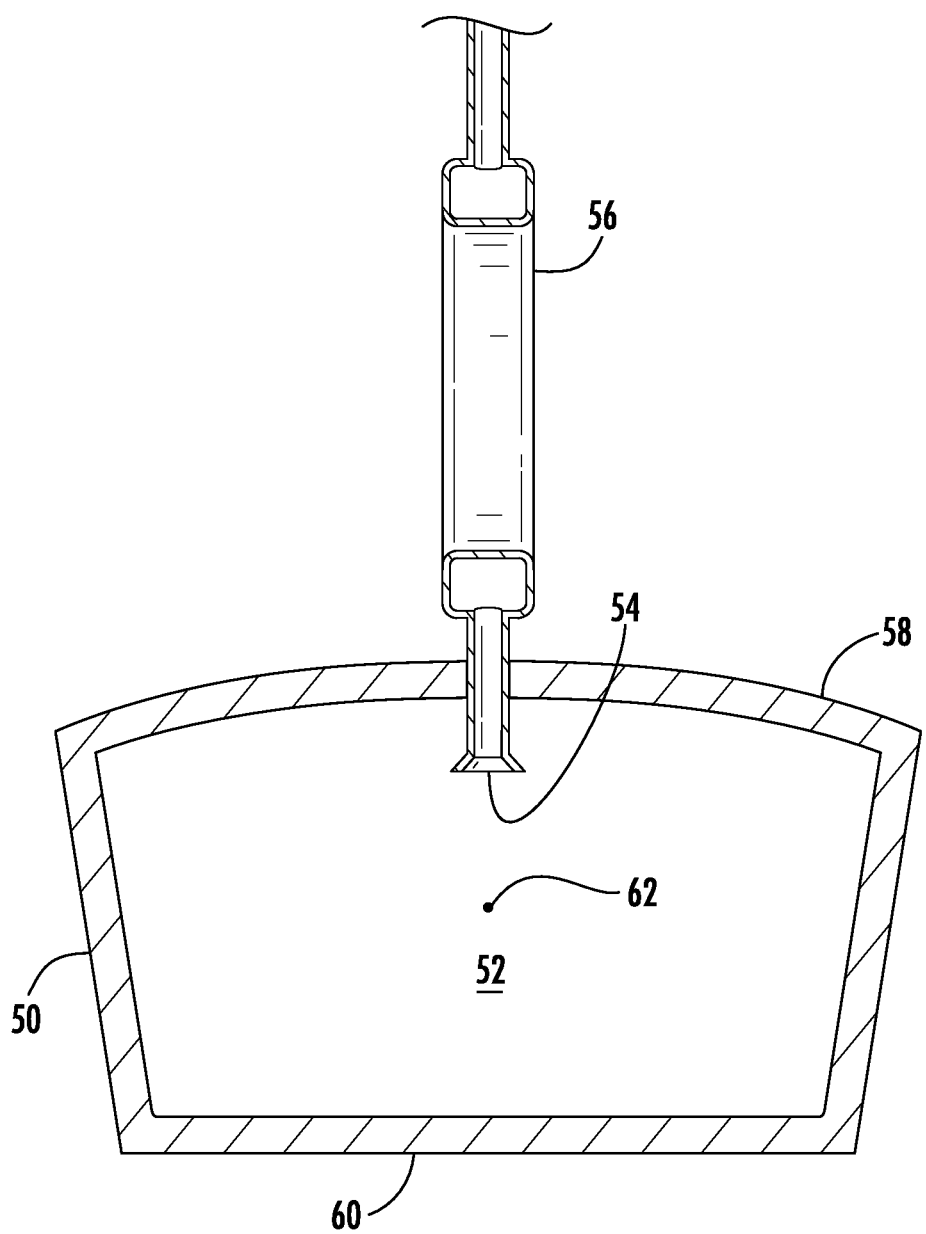
FIG. 3 is an axial cross-section view of the gas turbine shown in FIG. 2 taken along line A-A.

FIG. 3 provides an axial cross-section view of the gas turbine 10 shown in FIG. 2 taken along line A-A. As shown most clearly in FIG. 3, the hot gas path 52 defined by the sleeve 50 may have radially outer and inner portions 58, 60 with respect to the rotor 18. The fuel injectors 54 may be located at various positions around the sleeve 50 to provide fluid communication into the hot gas path 52. For example, as shown in the particular embodiment illustrated in FIG. 3, the fuel injectors 54 may provide fluid communication into the hot gas path 52 through the radially outer portion 58 of the sleeve 50.

Figure 4:
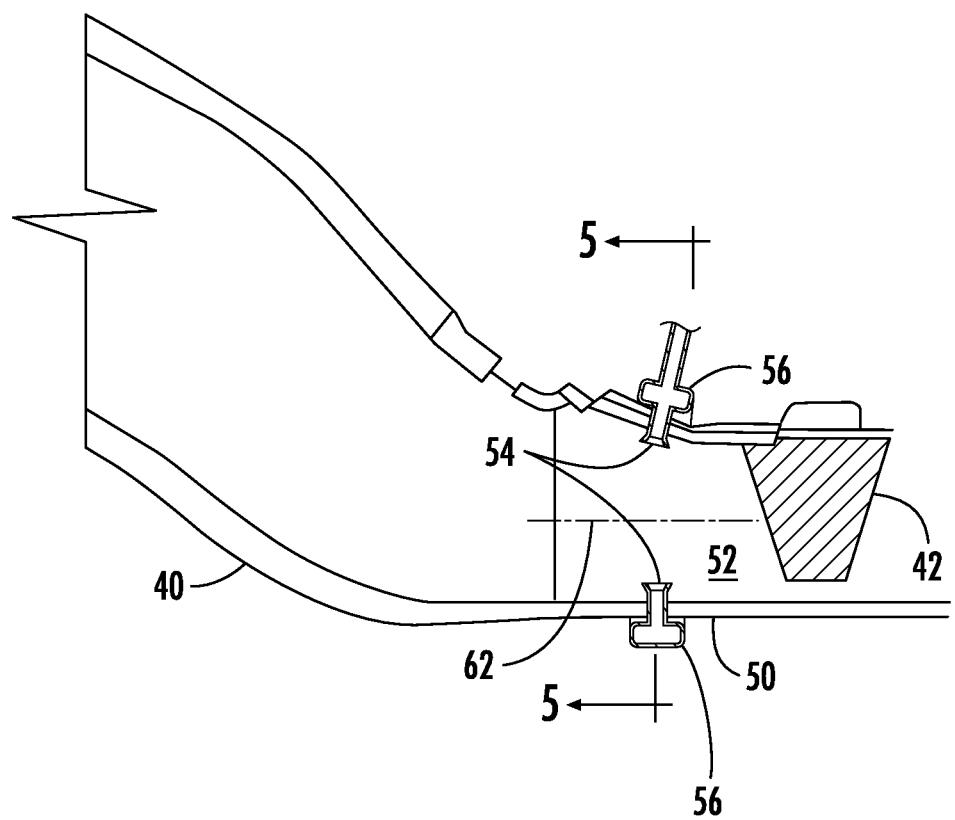
FIG. 4 is an enlarged side cross-section view of a portion of the gas turbine shown in FIG. 1 according to a second embodiment of the present invention.
Figure 5:
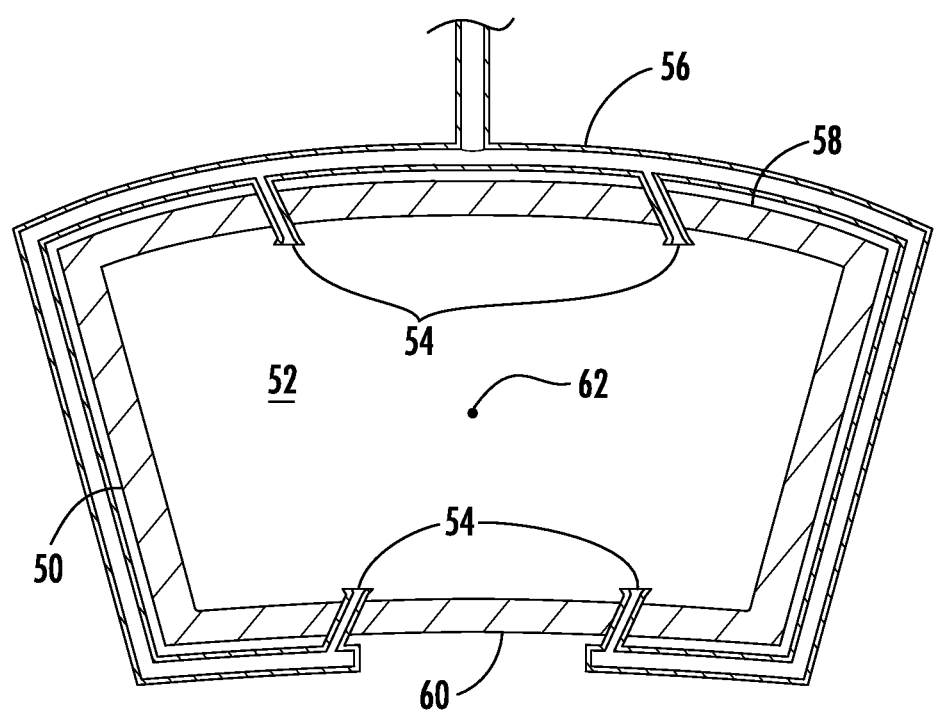
FIG. 5 is an axial cross-section view of the gas turbine shown in FIG. 4 taken along line B-B.

FIG. 4 provides an enlarged side cross-section view of a portion of the gas turbine 10 shown in FIG. 1 according to a second embodiment of the present invention, and FIG. 5 provides an axial cross-section view of the gas turbine 10 shown in FIG. 4 taken along line B-B. As shown in FIGS. 4 and 5, the gas turbine 10 again includes the transition duct 40, sleeve 50, hot gas path 52, and first stage of vanes 42 as previously described with respect to the embodiment shown in FIGS. 1-3. In the particular embodiment shown in FIGS. 4 and 5, however, the fuel plenum 56 circumferentially surrounds at least a portion of the sleeve 50 and the hot gas path 52. As a result, the fuel flowing through the fuel plenum 56 may receive heat from both the compressed working fluid 22 flowing through the compressor discharge plenum 30, as well as the combustion gases flowing through the sleeve 50 before the fuel reaches the fuel injectors 54. In addition, the fuel injectors 54 may be located circumferentially around the sleeve 50 to more evenly disperse the fuel through both the radially outer and inner portions 58, 60 of the sleeve 50. Alternately or in addition, the fuel injectors 54 may be angled radially, axially, and/or azimuthally with respect to an axial centerline 62 of the hot gas path 52. In this manner, the fuel may be injected into the hot gas path 52 at an angle that complements or coincides with the angle of incidence of the first stage of vanes 42.

The various embodiments previously described and illustrated with respect to FIGS. 1-5 may also provide a method of supplying fuel to the gas turbine 10. The method may include combusting a first fuel in the combustion chamber 38 to produce combustion gases, flowing the combustion gases through the transition duct 40 to the hot gas path 52, and flowing the combustion gases through the hot gas path 52 to a first stage of stationary vanes 42 in the turbine section 16, as is known in the art. In addition, the method may include injecting a second fuel through the sleeve 50 and into the hot gas path 52 downstream from the transition duct 40 and upstream from the first stage of stationary vanes 42.

In particular embodiments, the method may further include flowing the second fuel through the toroidal fuel plenum 56 outside of the gas path 52 and/or flowing the second fuel through the fuel plenum 56 that circumferentially surrounds at least a portion of the hot gas path 52. Alternately or in addition, the method may include injecting the second fuel into the hot gas path 52 through one or more fuel injectors 54 circumferentially arranged around the hot gas path 52 and/or angled with respect to the axial centerline 62 of the hot gas path 52.

One of ordinary skill in the art will readily appreciate from the teachings herein that the various embodiments shown and described with respect to FIGS. 1-5 may provide one or more benefits over existing gas turbine designs. For example, the additional combustion produced by the fuel supplied through the sleeve 50 to the hot gas path 52 may increase the combustion gas temperature reaching the turbine section 16 to enhance the efficiency of the gas turbine 10. In addition, the proximity of the fuel injectors 54 to the turbine section 16 reduces the residence time of the combustion gases that might otherwise increase $NO_X$ emissions.

This written description uses examples to disclose the invention, including the best mode, and also to enable any person skilled in the art to practice the invention, including making and using any devices or combustors and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel supply system for a gas turbine, comprising:
   a. a combustion section;
   b. a transition duct downstream from the combustion section;
   c. a turbine section downstream from the transition duct;
   d. a first stage of stationary vanes circumferentially arranged inside the turbine section;
   e. a sleeve defining a hot gas path between the transition duct and the first stage of stationary vanes; and
   f. a fuel injector extending from the sleeve that provides fluid communication into the hot gas path defined by the sleeve downstream from the transition duct and upstream from the first stage of stationary vanes.

2. The fuel supply system as in claim 1, further comprising a fuel plenum outside of the gas path and in fluid communication with the fuel injector.

3. The fuel supply system as in claim 2, wherein the fuel plenum has a toroidal shape.

4. The fuel supply system as in claim 2, wherein the fuel plenum circumferentially surrounds at least a portion of the hot gas path.

5. The fuel supply system as in claim 1, further comprising a plurality of fuel injectors circumferentially arranged around the hot gas path between the transition duct and the first stage of stationary vanes, wherein each of the plurality of fuel injectors provides fluid communication into the hot gas path between the transition duct and the first stage of stationary vanes.

6. The fuel supply system as in claim 1, wherein the hot gas path comprises a radially outer portion and a radially inner portion opposed to the radially outer portion, and the fuel injector provides fluid communication into the hot gas path through the radially outer portion.

7. The fuel supply system as in claim 1, wherein the fuel injector is angled radially, axially, and/or azimuthally with respect to an axial centerline of the hot gas path.

8. A fuel supply system for a gas turbine, comprising:
   a. a compressor section;
   b. a combustion chamber downstream from the compressor section;
   c. a transition duct downstream from the combustion chamber;
   d. a turbine section downstream from the transition duct;
   e. a first stage of stationary vanes circumferentially arranged inside the turbine section;
   f. a sleeve downstream from the transition duct, wherein the sleeve provides fluid communication between the transition duct and the first stage of stationary vanes; and
   g. a fuel injector that provides fluid communication into the sleeve between the transition duct and the first stage of stationary vanes.

9. The fuel supply system as in claim 8, further comprising a fuel plenum outside of the sleeve and in fluid communication with the fuel injector.

10. The fuel supply system as in claim 9, wherein the fuel plenum has a toroidal shape.

11. The fuel supply system as in claim 9, wherein the fuel plenum circumferentially surrounds at least a portion of the sleeve.

12. The fuel supply system as in claim 8, further comprising a plurality of fuel injectors circumferentially arranged around the sleeve between the transition duct and the first stage of stationary vanes, wherein each of the plurality of fuel injectors provides fluid communication into the sleeve between the transition duct and the first stage of stationary vanes.

13. The fuel supply system as in claim 8, wherein the sleeve comprises a radially outer portion and a radially inner portion opposed to the radially outer portion, and the fuel injector provides fluid communication into the sleeve through the radially outer portion.

14. The fuel supply system as in claim 8, wherein the fuel injector is angled radially, axially, and/or azimuthally with respect to an axial centerline of the sleeve.

15. A method of supplying fuel to a gas turbine, comprising:

a. combusting a first fuel in a combustion chamber to produce combustion gases;
b. flowing the combustion gases through a transition duct to a sleeve downstream from the transition duct that defines a hot gas path;
c. flowing the combustion gases through the hot gas path defined by the sleeve to a first stage of stationary vanes in a turbine section; and
d. injecting a second fuel through the sleeve into the hot gas path downstream from the transition duct and upstream from the first stage of stationary vanes.

16. The method as in claim 15, further comprising flowing the second fuel through a toroidal fuel plenum outside of the gas path.

17. The method as in claim 15, further comprising flowing the second fuel through a fuel plenum that circumferentially surrounds at least a portion of the hot gas path.

18. The method as in claim 15, further comprising flowing the second fuel into the hot gas path through a plurality of fuel injectors circumferentially arranged around the hot gas path between the transition duct and the first stage of stationary vanes.

19. The method as in claim 15, further comprising injecting the second fuel through a radially outer portion of the hot gas path.

20. The method as in claim 15, further comprising injecting the second fuel at an angle with respect to an axial centerline of the hot gas path.

\* \* \* \* \*